Jan. 18, 1966    J. E. COWMAN    3,229,814
PACKAGE HAVING CUSHION SEPARATORS
Filed Dec. 12, 1961    2 Sheets-Sheet 1
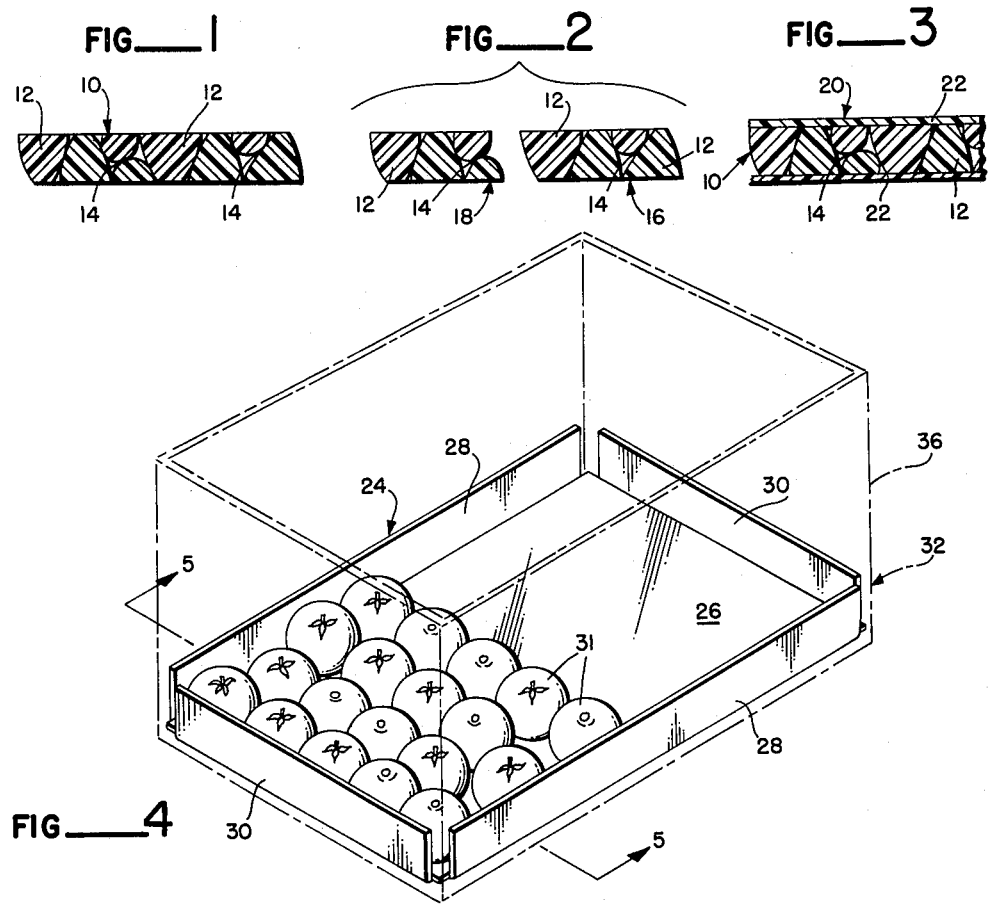
INVENTOR.
JOHN E. COWMAN
BY
T W Secrest Jan. 18, 1966    J. E. COWMAN    3,229,814
PACKAGE HAVING CUSHION SEPARATORS
Filed Dec. 12, 1961    2 Sheets-Sheet 2
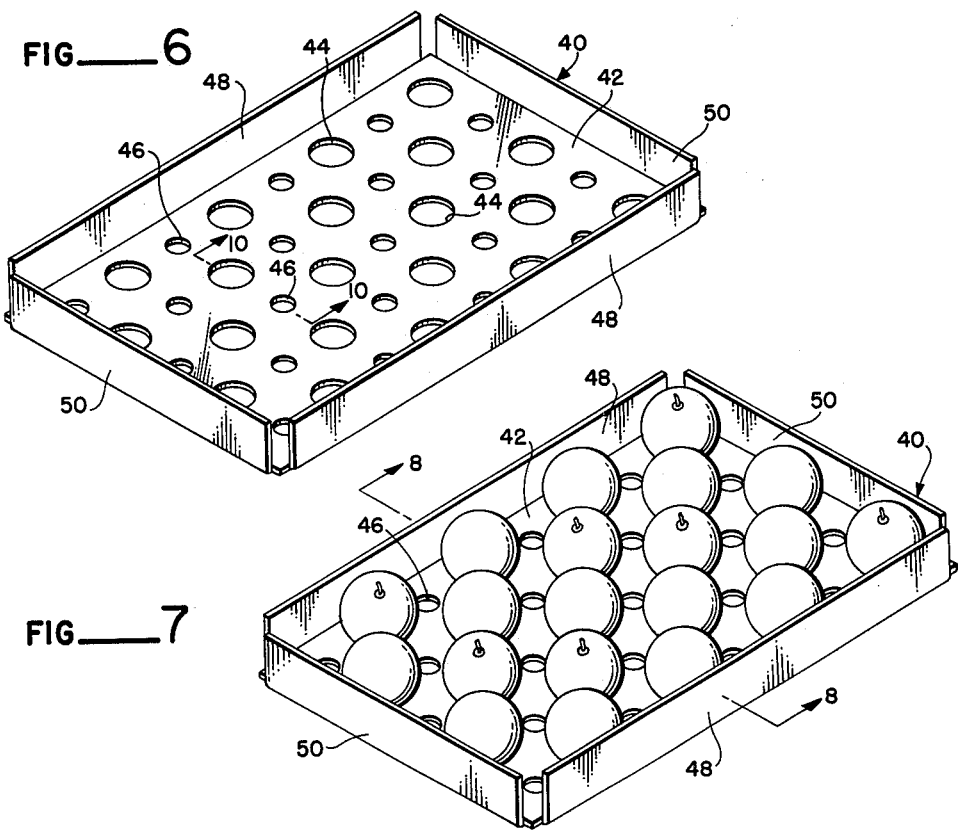
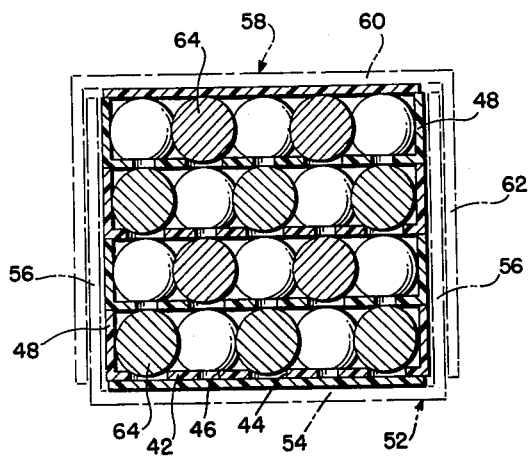
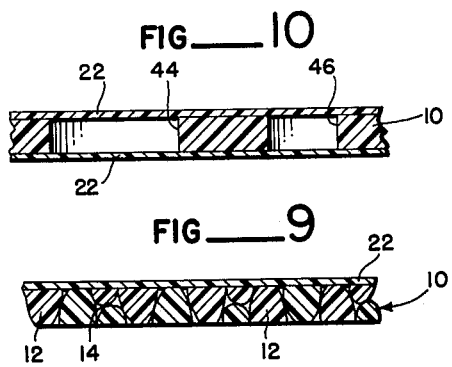
INVENTOR.
JOHN E. COWMAN
BY
T W Secrest

United States Patent Office 3,229,814
Patented Jan. 18, 1966

3,229,814
PACKAGE HAVING CUSHION SEPARATORS
John E. Cowman, Seattle, Wash., assignor of thirty-three and one-third percent to Ralph J. Smalling, Tacoma, Wash., and thirty-three and one-third percent to Thomas W. Secrest, Seattle, Wash.
Filed Dec. 12, 1961, Ser. No. 159,825
6 Claims. (Cl. 206—65)

This invention relates to a flexible sandwich comprising a core and a surface coating material, and which sandwich may be flexed and, also, compressed and impart to the core and the flexuous characteristics of the surface coating material.

In the packaging of perishable items such as fruits and vegetables, namely, tomatoes and apples, there has been considerable damage in the using of the normal conventional pack. These normal conventional packs may be the fruit or vegetable wrapped in a separate paper or may be trays made of pressed pulp or pressed paper. With the knowledge of these shortcomings of the conventional packaging materials at my disposal, I have invented a packaging material which is resilient, tough and flexible so as to be able to receive a fruit or a vegetable; light in weight so as to reduce shipping costs; shock absorbent for reducing the effect of sudden movement of the package on the article packed; which can be manufactured from relatively inexpensive raw materials; which does not support mold; which is sanitary; and which, in the main, reduces packaging costs for the objects packed as there is less damage to the objects and, therefore, less spoilage; and may be packed in larger containers than those containers used prior to my invention. With these objects and advantages in mind, a more complete description of my invention may be realized with reference to the accompanying drawings, the detailed specification of the invention and the claims.

In the drawings:

FIGURE 1 is a cross-sectional view of a sheet of packaging material comprising a cut sheet of expanded polystyrene beads bonded together;

FIGURE 2 illustrates the cleavage between beads in a cut sheet of expanded polystyrene bead after the sheet has been subjected to tension and bending forces;

FIGURE 3 illustrates a sandwich comprising a cut sheet of expanded polystyrene bead having bonded on the opposed faces a surface film;

FIGURE 4 is an isometric view looking down on a separator comprising a sandwich having a cut sheet of polystyrene beads bonded on its two faces with film, and illustrates an article such as a tomato packed on the separator with the outer edges of the separator with respect to the main body of the separator;

FIGURE 5 is a lateral cross-sectional view taken on line 5—5 of FIGURE 4 and illustrates the manner in which the tomato may be packaged in a container using my sandwich separator divider;

FIGURE 6 is an isometric view looking down on a separator comprising a cut sheet of expanded polystyrene bead having openings therein and having bonded on two opposed faces film;

FIGURE 7 is an isometric view looking down on the sheet of FIGURE 6 and with apples positioned on such sheet;

FIGURE 8 is a lateral cross-sectional view taken on line 8—8 of FIGURE 7 and illustrates the packaging of an article such as an apple in a box using the sandwich of FIGURE 6;

FIGURE 9 is a lateral cross-sectional view of a sheet showing cut expanded polystyrene beads bonded together and with a coating of a bonding material on one face thereof.

FIGURE 10, on an enlarged scale, is a lateral cross-sectional view taken on lines 10—10 of FIGURE 6 and shows the film on the two surfaces of the core and overlying the openings in said core.

In FIGURE 1 there is illustrated a cut sheet of expanded bonded together polystyrene beads having discrete units 12. It is seen that these units 12 may be of various sizes and are bonded together at their adjacent surfaces 14. The bonding strength between the discrete units 12 is of a relatively low order; and, upon being flexed and subjected to tensile forces, break apart as illustrated in FIGURE 2. In FIGURE 2 it is seen that there is one unit 16 and another unit 18 due to the rupture of the bond between adjacent discrete particles 12. Typical examples of such a cut sheet are expanded polystyrene beads which have been made into a foam and cut from the block or log. Another example may be popcorn, and other examples may be rebonded urethane particles, rebonded foam rubber particles and cork. The surface of the popcorn may be coated with an adhesive and then formed into a block. A sheet may be cut from the block of popcorn.

In FIGURE 3 there is illustrated a sandwich 20. This sandwich 20 comprises a sheet 10 having two surfaces and a film 22 on these two surfaces.

A suitable sheet material 10 is a cut sheet of expanded polystyrene beads. The expanded polystyrene beads may have a density ranging from approximately one-half pound per cubic foot to eight pounds per cubic foot. The film 22 may be one of a number of films such as polyester; polyethylene (low density); polypropylene; polyvinyl alcohol; polyvinyl chloride (rigid) polyvinyl chloride (non-rigid); vinylidene chloride-vinyl chloride copolymer; regenerated cellulose (cellophane); tissue paper, glassine, creped and impregnated papers. The thickness of the film 22 may vary over a wide range of approximately one-fourth of one mil to approximately 5 mils (0.0025 inch to 0.050 inch). The thickness of the sheet 10 for packaging purposes may vary from one thirty-second of an inch up to approximately one-half of an inch.

The expanded polystyrene bead or cork sheet or bonded popcorn is substantially a rigid material. To the best of my knowledge and, prior to my invention, these materials have been used for rigid structures such as rigid packaging and rigid insulation. What I have done is to take this substantially rigid material and, by processing it and bonding it to a sheet, have converted it into a flexible material. The cut sheet expanded polystyrene beads which have been bonded together have desirable compressive properties; but, upon being subjected to fold or flexure of approximately 45°, the bonding strength is so low that quite often the beads in the sheet will separate. Further, upon being subjected to tensile forces, the bonding strength is so low that the beads will separate in the thin sheet form. Remember, in the thick sheet, the beads are substantially rigid and will not bend while in the thin sheet the beads will bend but can only be bent a few times without breaking, usually one or two bends. Since the expanded polystyrene bead has desirable compressive properties and these properties allow it to be used for packaging, I have bonded a flexible film or skin to the surface of the sheet. The materials which I have used, above identified, have desirable flexual properties, tensile properties and fold-strength properties. There is a synergetic result whereby the sandwich of the beads and the film have desirable compressive properties and, also, desirable tensile, flexure, fold and shearing properties. In effect, the sheet in thin layers such as less than one half inch in thickness and the skin makes it possible to use the material for packaging of easily damaged articles such as tomatoes and apples and mechanical equipment. The skin contributes abrasive and puncture resistance to the sandwich. Referring to FIGURE 3 again, it is to be pointed out that in the cut expanded polystyrene bead sheet, the film 22 is bonded to more area of the discrete expanded bead than the bead is bonded to adjacent beads. Also, the bond between the film 22 and the bead is somewhat stronger than the bond between the adjacent beads. This makes it possible to bend the sandwich 20. More particularly, the relative weakness between the bonds between the individual units of the expanded polystyrene as compared to the strength of the bond between the sheet 22 and the polystyrene makes it possible to bend the sheet 10 and, therefore, the sandwich 20. Remember, the film or skin 22 is flexible and can be easily bent and can be stretched.

In FIGURE 4 there is illustrated a sandwich 24 comprising a core sheet and a film on both of the surfaces as more particularly illustrated in FIGURE 3. The separator 24 has a large surface 26 in the configuration of a rectangle and the outer edges 28 and 30. Placed on the main body 26 of this separator 24 may be tomatoes 31.

This is more particularly brought forth in FIGURE 5 where it is seen that the separators 24 are placed in a container 32. This container 32 has a bottom 34 and sides 36. With the type of pack illustrated in FIGURE 5 it is possible to package tomatoes six trays or six separators deep. It is to be recalled that with the conventional tomato pack, viz., a wooden box, it has been possible to pack tomatoes only two layers deep. One of the reasons for being able to pack the tomatoes six layers deep is that side edges 28 help support the trays or separators 24. This means that the tomatoes themselves do not necessarily carry all of the weight but some of the weight is carried by the outer flaps 28 and 24. Another reason which makes it possible to pack the tomatoes six layers deep is that the sandwich has desirable compressive properties and the tomatoes are seated or embedded in the sandwich.

In FIGURE 6 there is illustrated a separator 40 having a main body portion 42. It is to be remembered that the separator 40 is basically a sandwich material as illustrated in FIGURE 3 and identified by the reference numeral 20. In the body portion 42 there are large openings 44 and small openings 46. Along the long sides of 42 there are side flaps 48 and along the short sides there are side flaps 50. In the placing of apples on the separator 40, it is to be realized that one way of packaging the apples is to place the apples on the upper surface of 40 in the large holes or openings 44.

It is to be realized that in the main body 42 of separator 40, the holes 44 and 46 are in the cut expanded polystyrene bead sheet, but that these openings are covered by the continuous film overlying the sheet. In this regard, see FIGURE 10. In FIGURE 10 it is seen that the opening 44 in the sheet is covered by the film 22 on both sides of the sheet.

In FIGURE 8 there is illustrated a box containing apples using the divider 40. More particularly, the box comprises a lower container 52 having a base 54 and sides 56. There is an upper container 58 having a top portion 60 and sides 62. The separators 40 are placed in the container 52 and the apples 64 are placed in the large openings 44 of the separator 40. Then another separator is placed over the apples so that the small openings 46 overly the apples 64 in the lower layer. Then, the apples in the next layer are placed on the large openings as illustrated. This may be repeated for as many layers as apples are stacked. It is seen that the flaps 48 and 50 in the next lower layer assist in supporting the next upper separator 40.

In the manufacture of the sandwich 20 it is to be realized that the film 22 may be bonded to the core material 10 either by an adhesive such as a vinyl emulsion or a rubber emulsion or a latex emulsion. In addition, the film 22 may be bonded to the core material 10 by heat sealing the same thereto. In addition the film may be embossed onto the core material 10 by heat.

The following examples are to be illustrative of my invention and are not to be taken as limitations of the same.

*Example I*

Tomatoes were packaged on a solid separator 24. The cut expanded polystyrene bead sheet had a density of approximately one pound per cubic foot and was approximately one eighth inch in thickness and the film was vinylide chloride-vinyl chloride copolymer having a thickness of approximately one half mil or 0.005 inches. The tomatoes were packaged six layers deep and there was substantially no damage to the tomatoes upon shipping.

*Example II*

In one package I prepared a sandwich 20 from cut expanded polystyrene beads. The thickness of the cut sheet was approximately one-eighth and the polystyrene had a density of approximately one pound per cubic foot. Bonded to both faces of the cut sheet was a vinylide chloride-vinyl chloride copolymer having a thickness of approximately one-half mil (0.05) inch. There was employed a solid sandwich on the bottom package and a separator 40 having a body portion 42, large openings 44 and small openings 46 and the side flaps 48 and 50. These apples were shipped from Yakima, Washington, to Washington, D.C., by railway express and there was substantially no damage to the apples during the trip.

Some of the desirable properties of my sandwich is that it can be immersed in water without losing its physical properties. Also, it will transmit mosture in the vapor and the liquid phases. This is of value as tomatoes are cooled after being packaged by immersing the package in water. With my sandwich material it is possible to immerse fruits and vegetables in the packaged state in cooling water, or to "wet pack" without damage to the separators. Also, it is possible with my packaging material to pack fruits and vegetables and to store the same in areas of relatively high humidity.

With ordinary foam sheet of low density, i.e., cut sheet of expanded polystrene bead having a density less than five pounds per cubic foot, it has not been possible to post form the same. The reason for this is that the sheet breaks during the post forming operation. With my sandwich it is possible to post form shapes by vacuum forming, compression molding, and stretch die molding processes.

Having presented my invention, what I claim is:

1. A sandwich comprising a sheet and film, said sheet being a cut sheet of expanded polystrene beads bonded together, said film being bonded to one face of the sheet, said film having a tensile strength at least ten times greater than the bonding strength between the beads, and said sandwich being flexible and having greater tearing strength and folding endurance than the sheet itself and yet retaining substantially the same compressive characteristics as the sheet itself.

2. A sandwich comprising a sheet and film, said sheet being a cut sheet of expanded polystyrene beads bonded together, said film being bonded to two opposed faces of the sheet, said film having a tensile strength at least ten times greater than the bonding strength between the beads, and said sandwich being flexible and having greater tearing strength and folding endurance than the sheet itself and yet retaining substantially the same compressive properties as the sheet itself.

3. A package, said package comprising a container and separators for the objects packed in the package, said separators being a sandwich comprising a sheet and film, said sheet being a cut sheet of expanded polystyrene beads bonded together, said film being bonded to one face of the sheet, said film having a tensile strength at least ten times greater than the bonding strength between the beads, and said sandwich being flexible and having greater tearing strength and folding endurance than the sheet itself and yet retaining substantially the same compressive characteristics as the sheet itself.

4. A package, said package comprising a container and separators for the objects packed in the package, said separators being a sandwich comprising a sheet and film, said sheet being a cut sheet of expanded polystyrene beads bonded together, said film being bonded to two opposed faces of the sheet, said film having a tensile strength at least ten times greater than the bonding strength between the beads, and said sandwich being flexible and having greater tearing strength and folding endurance that the sheet itself and yet retaining substantially the same compressive properties as the sheet itself.

5. A package, said package comprising a container and separators for the objects packed in the package, said separators having larger outside dimensions that the inside dimensions of the container so that in the package the outside edges of the separators are folded with respect to the main body of the separators, said separators being a sandwich comprising a sheet and a film, said sheet being a cut sheet of expanded polystyrene beads bonded together, said film being bonded to one face of the sheet, said film having a tensile strength at least ten times greater than the bonding strength between the beads, and said sandwich being flexible and having greater tearing strength and folding endurance than the sheet itself and yet retaining substantially the same compressive characteristics.

6. A package, said package comprising a container and separators for the objects packed in the package, said separators having larger outside dimensions than the inside dimensions of the container so that in the package the outside edges of the separators are folded with respect to the main body of the separators, said separators being a sandwich comprising a sheet and a film, said sheet being a cut sheet of expanded polystyrene beads bonded together, said film being bonded to two opposed faces of the sheet, said film having a tensile strength at least ten times greater than the bonding strength between the beads, and said sandwich being flexible and having greater tearing strength and folding endurance than the sheet itself and yet retaining substantially the same compressive properties as the sheet itself.

References Cited by the Examiner

UNITED STATES PATENTS

| | | | |
|---|---|---|---|
| 1,249,197 | 12/1917 | Rhodes. | |
| 1,882,792 | 10/1932 | Fischer | 154—45.9 |
| 1,952,766 | 3/1934 | Mazer | 154—54 |
| 2,147,362 | 2/1939 | Bloomberg | 154—54 |
| 2,339,475 | 1/1944 | Hartsell | 206—65 |
| 2,563,115 | 8/1951 | Huggins. | |
| 2,579,036 | 12/1951 | Edelman | 206—46 |
| 2,770,406 | 11/1956 | Lane | 229—3.5 |
| 2,962,158 | 11/1960 | Struthers | 206—46 |
| 2,981,984 | 5/1961 | Orr. | |
| 3,006,780 | 10/1961 | Shaffer. | |
| 3,027,286 | 3/1962 | Kurhan | 206—46 |
| 3,038,828 | 6/1962 | Yakubik | 154—49 |

FOREIGN PATENTS

| | | |
|---|---|---|
| 467,281 | 8/1950 | Canada. |
| 20,391 | 1892 | Great Britain. |
| 394,885 | 7/1933 | Great Britain. |
| 645,445 | 11/1950 | Great Britain. |
| 832,101 | 4/1960 | Great Britain. |
| 832,217 | 4/1960 | Great Britain. |

THERON E. CONDON, *Primary Examiner.*

EARLE J. DRUMMON, *Examiner.*